US008374491B2

(12) United States Patent
Rhoads

(10) Patent No.: US 8,374,491 B2
(45) Date of Patent: *Feb. 12, 2013

(54) METHODS FOR READING WATERMARKS IN UNKNOWN DATA TYPES, AND DVD DRIVES WITH SUCH FUNCTIONALITY

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 1924 days.

This patent is subject to a terminal disclaimer.

(21) Appl. No.: 10/841,970

(22) Filed: May 6, 2004

(65) Prior Publication Data

US 2005/0008334 A1 Jan. 13, 2005

Related U.S. Application Data

(63) Continuation of application No. 09/399,989, filed on Sep. 20, 1999, now Pat. No. 6,766,102.

(51) Int. Cl.
*H04N 9/80* (2006.01)

(52) U.S. Cl. ...................................... 386/260

(58) Field of Classification Search ............... 386/1, 94, 386/5, 124, 125, 126, 111, 112, 252, 259, 386/260, 248; 360/60; 380/201, 202, 203, 380/200, 239; 382/100; 375/240

See application file for complete search history.

(56) References Cited

U.S. PATENT DOCUMENTS

| 5,315,448 | A | | 5/1994 | Ryan |
| 5,767,799 | A | * | 6/1998 | Maertens et al. ............... 341/67 |
| 5,896,454 | A | | 4/1999 | Cookson et al. |
| 5,901,178 | A | * | 5/1999 | Lee et al. ...................... 375/240 |
| 5,945,930 | A | * | 8/1999 | Kajiwara ......................... 341/50 |
| 6,047,103 | A | * | 4/2000 | Yamauchi et al. .............. 386/94 |
| 6,131,161 | A | * | 10/2000 | Linnartz ....................... 713/176 |
| 6,285,774 | B1 | | 9/2001 | Schumann et al. |
| 6,314,518 | B1 | | 11/2001 | Linnartz |
| 6,332,194 | B1 | * | 12/2001 | Bloom et al. .................. 380/201 |
| 6,373,960 | B1 | * | 4/2002 | Conover et al. ............... 382/100 |
| 6,490,355 | B1 | * | 12/2002 | Epstein ......................... 380/203 |
| 6,674,858 | B1 | * | 1/2004 | Kimura et al. ................. 380/202 |
| 6,766,102 | B1 | * | 7/2004 | Rhoads ........................... 386/94 |
| 2001/0038704 | A1 | | 11/2001 | Ito et al. |

FOREIGN PATENT DOCUMENTS

EP 1017226 7/2000

OTHER PUBLICATIONS

Perceptual Watermarks for Digital Images and Video by Raymond B. Wolfgang, Christine I. Podilchuk, and Edward J. Delp (Proceedings of the IEEE, vol. 87 No. 7, Jul. 1999).*

Bloom et al., "Copy Protection for Dvd Video", Proceeding of the IEEE, vol. 87, No. 7, Jul. 1999, pp. 1267-1276.

Call for Proposals Issued by the Data Hiding SubGroup, Copy Protection Technical Working Group, Version 1.0, Jul. 1, 1997.

(Continued)

*Primary Examiner* — Tat Chio

(57) ABSTRACT

To prevent playback of pirated, non-encrypted video, a DVD-based system examines data read from a DVD disk for MPEG-like characteristics. If such attributes are detected, the data is examined for the presence of a video usage-control watermark. The presence of such watermark indicates that the video should be distributed only in encrypted form, so playback of video from the disk is prevented.

20 Claims, 1 Drawing Sheet

OTHER PUBLICATIONS

"IBM DataHiding.TM. Proposal", Version 1.0, In Response to the Call for Proposal Ver. 1.0, Jul. 1, 1997. Issued by the Data Hiding SubGroup of the Copy Protection Technical Working Group, IBM Corporation, Sep. 2, 1997.

Miller et al., "Watermarking in the Real World: An Application to DVD", Previously presented at the Security Issue in Multimedia Systems Workshop, IEEE Multimedia Systems '98 and the Workshop on Multimedia and Security; ACM Multimedia '98, reprinted with permission, 1999, pp. 1496-1502.

"NEC Data Hiding Proposal", Response to Call for Proposal Issued by the Data Hiding SubGroup of the Copy Protection Technical Working Group, Version 1.0, Jul. 1, 1997, Oct. 3, 2002.

Philips Electronics Response to Call for Proposals Issued by the Data Hiding SubGroup of the Copy Protection Technical Working Group, Oct. 3, 2002.

Sony Corporation, Version 1.0, Response for Copyright Protection System using Watermark Technology, 1997.

Notice of Allowance on U.S. Appl. No. 09/399,989, mailed Apr. 5, 2004.

Non-Final Office action on U.S. Appl. No. 09/399,989, mailed Oct. 22, 2003.

Final Office action on U.S. Appl. No. 09/399,989, mailed Dec. 31, 2002.

Non-Final Office action on U.S. Appl. No. 09/399,989, mailed Jul. 5, 2002.

\* cited by examiner

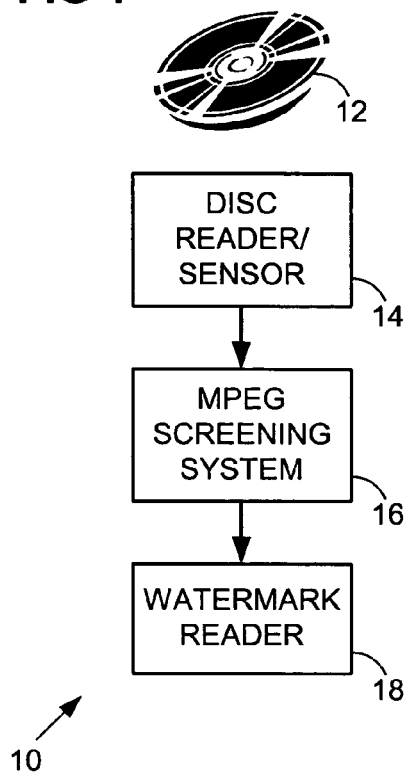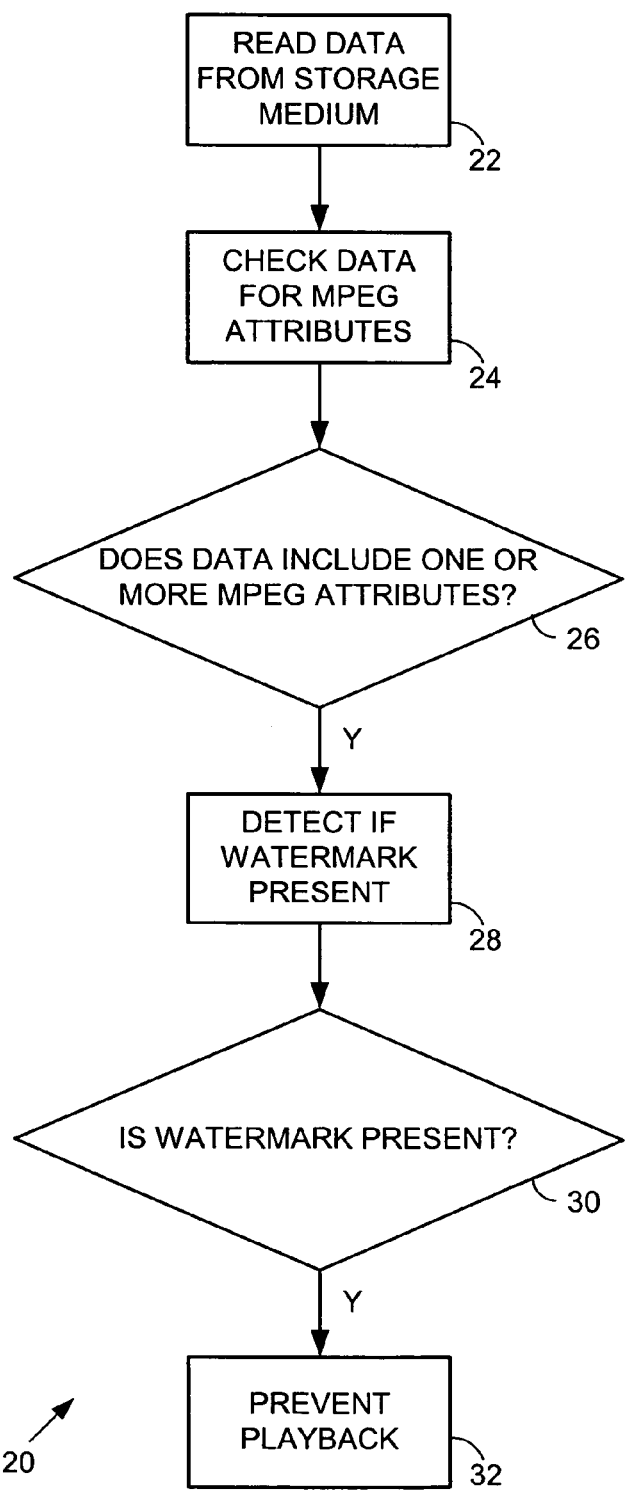

METHODS FOR READING WATERMARKS IN UNKNOWN DATA TYPES, AND DVD DRIVES WITH SUCH FUNCTIONALITY

RELATED APPLICATION DATA

This application is a continuation of application Ser. No. 09/399,989, filed Sep. 20, 1999.

FIELD OF THE INVENTION

The present invention relates to digital video, and more particularly relates to techniques for recognizing digital video so that certain usage-control systems may be implemented.

DETAILED DESCRIPTION

Certain applications would benefit from knowing whether a media-specific watermark is present in, effectively, a "bucket of bits." In other words, one only knows, a priori, that one has a set of binary information, and even the very existence of a media object—whether audio, video or still image—is in question. It would be nice to first answer the question of whether a media object exists within this bucket of bits, followed by determining the specific form or format of that object (e.g., MPEG stream, JPEG image, BMP image, WAV file, etc.). Once the media object (if any) is characterized, it can be examined for a watermark. This disclosure provides a method for doing just this. It is presented in the harshest case of complete ignorance about the bucket of bits, whereas most practical applications will have additional knowledge about the data that can assist in correctly identifying its form and function, thus assisting in the watermark reading process.

Imagine we start with 10 Kilobytes of data randomly taken from any of the dozens of the digital physical media available (CD's, DVD's, Hard drives, memory, communication streams . . . anywhere at all). These bytes just show up on your doorstep somehow. You ask, is this a media object I should be interested in? And if so, is there a watermark in there?

Let's begin with two extremes, one where it is generally impossible to figure out whether or not a media object is present and what its form is, and one where it is relatively straightforward. We will then move on to the gray area in between.

The "impossible" case is where some data object such as text, a program, a video, an image, whatever, has been encrypted using decent modern cryptographic methods. The essential point of cryptography is to not let some random person know what is "within the data." Generally speaking, gross level characteristics and statistics of such data have been tidily swept clean and no discernable patterns can be found. The act of determining whether a watermark exists in such data is predicated upon specific breakdowns in cryptographic procedure, an area we will happily steer around in this disclosure and leave for braver souls.

On the other hand, one example of very many straightforward cases might be the following. A program is written simply to hunt for JPEG headers. Byte by byte, it simply walks through the whole bucket of bits and, bit by bit or byte by byte, simply "assumes" that a given bit or byte is the beginning of a JPEG header and sees if it can coherently decode the header using that bit/byte as a starting point, not quite knowing exactly where the ending point is. (Some headers have very precise lengths, speaking to this latter point about not knowing how long it is). As with the millions of monkeys typing on their keyboards eventually producing Hamlet, every now and then this program will think it has found a valid header when it has indeed found garbage, but it can then either begin to look for telltale Huffman streams and refine its ability to recognize a JPEG image, or, more simply, it can simply not care it might be finding garbage and invoke a watermark reading process on "presumed" JPEG data. The worst that can happen is that no watermark is found or read.

(The present technology is applicable with any digital watermarking technique; exemplary watermarking techniques are disclosed in U.S. Pat. Nos. 5,832,119, 5,825,892, and 5,915,027.)

In this simpler case of looking for a JPEG header, the process of reading a watermark from this initially unknown bucket of bits is then to simply run the JPEG header-hunter routine followed by any standard watermark reading routine. End of story.

Let's now look at some more difficult cases and attempt to specify certain operations that could underpin any generalized watermark reader on generalized unknown data.

Let's look at the case of an MPEG stream where it may be impractical to "search for telltale headers." It might even be that a non-cryptographic-grade scrambling function has been applied to the pure MPEG stream, i.e., a scrambling function which is meant to stop average consumers from co-opting materials but certainly has no pretensions of stopping cryptographic pro's.

In the non-scrambled version, a "random sampling watermark detector" can be built which basically operates on some small but non-trivial "chunk" of data, essentially asking a series of questions all revolving around the basic question of "do you have MPEG-like data structures." Examples include: "are there data structures which resemble sequences of macroblocks, with subsequences of 4 blocks within the macroblocks?" More specifically, and similar to the JPEG header-hunter, the existence of macroblocks can be assumed, but with an unknown "start point;" many trial start points can be tried and some start points (followed by typical decoding steps associated with MPEG/Huffman decoding) will start to produce what appear to be true macroblock data. Options include assuming it is indeed macroblock data and attempting watermark reading, but more likely other questions will be asked of the data before the step of watermark reading is invoked.

Returning back to the "do you have MPEG-like data structures" issue then, another example might include looking for interframe sub-header data structures as well, or looking for these only if an earlier step thinks it might be seeing true macroblock data.

One can also treat raw ones and zeros of the data stream as a time waveform and look at is spectral and statistical properties and look for "MPEG class signatures" within these transformed spaces.

In any event, once some reasonable level of confidence is obtained that an MPEG object exists within the bucket of bits and once some general notion of where macroblocks are synchronized, a watermark reading routine can be invoked and a "positive read" (in the case where false positives are pre-designed to be very unlikely) is the best way of making sure that an object is an MPEG object.

One final note on the non-scrambled MPEG case, the "do you have MPEG-like data structures" questions can be seen as distinct modules, each with a probability attached. These modules can be stacked in order to gain sufficient confidence that an MPEG stream is present. Furthermore, interim states of confidence can invoke grabbing of more data and reapplying the question modules to more data if a sufficient level of confidence is not reached right away. The issue here gets down to "which is computationally cheaper," getting more data and building confidence, or simply going for a full watermark read routine.

Moving on to the scrambled MPEG video case, a similar philosophy of asking a set of modularized questions can be used, only they will be much more along the classic cryptographic analysis lines than in the non-scrambled case which can search for specific structures. Furthermore, presumably most applications which intend to look for these scrambled signals will also have the means to unscramble the data if a scrambled stream is indeed found. Building in the means to "sleuth the scrambling" is certainly not an intent of this disclosure. Implicit in all of this is that the process to "descramble the signal using all arbitrary starting points" is computationally more expensive than the process to ask the questions "do you have scrambled MPEG-like data characteristics?" Key words have changed in this phrasing of the question.

In the scrambled case, then, we find a three step process: 1) look for scrambled MPEG signal characteristics, including looking for specific commercial flavors of scrambling; 2) descramble the data if a certain confidence level is reached in number 1, where one may need to grab more data if the initial chunk grabbed is insufficient for descrambling; then 3) invoke any given watermark reading routines properly synchronized to the macroblocks (which is assumed to be feasible due to the proper descrambling method being used in step 2).

Generalizing all of this to arbitrary media objects, not just JPEG and MPEG, any given target media type would have their question modules with procedures tuned to characteristics and structures unique to their specific type/format. Question modules (sometimes just one) are stacked and applied to the bucket of bits. Confidence levels either remain low or begin to peak when a given media object being searched for starts showing up in the bucket of bits. Then watermark reading routines are invoked, routines associated with the given media object that is showing up on the confidence radar screen.

Generalizing this yet further, these techniques can be applied to the time waveform of data into and out from a CPU or any digital node within a digital system. The question modules, the decoding (descrambling) modules, and the watermark types can all be tuned to a given node, and a generalized watermark reader can effectively watch digital traffic go by, then potentially add value to consumers who want to enable certain operations connected to certain watermarked media objects, or can add value to copyright holders who have every intent to retain their rights to their material and ensure that any uses of their material have been properly paid for or permitted.

One particular application of such technology is as an adjunct to a copy protection system for digital video. A variety of such systems are known, as illustrated by U.S. Pat. Nos. 5,915,018, 5,949,877, 5,923,754, and 5,883,958, and by the Content Scrambling System (CSS), licensed by Matsushita. Video distributed in accordance with the CSS standard is encrypted for storage on a DVD disk. Playback devices encountering such CSS-encrypted data must have CSS decryption hardware or software for the playback to proceed. Matsushita is working to incorporate a digital watermark component to provide further playback and copy control features. Two industry consortia, one composed of the present assignee, Macrovision and NV Philips, and the other composed of IBM, NEC, Hitachi, Sony and Pioneer, have proposed specific watermarking systems that may be suitable. (See www.dvcc.com/warp for specifics of the proposals.) For expository convenience, such watermarking systems are here called CSS watermarking systems.

A problem arises, however, if a hacker gains access to the un-encrypted video, e.g., by intercepting the analog drive signals fed to the display device. Such video signals can be re-digitized, and stored on writable media (the writable DVD is not far off) for playback without CSS constraints. Such pirated video clearly poses a large economic threat to Hollywood and other content providers. However, such video would still include the CSS watermark and, if the non-CSS-encoded data being read from a DVD disk can be recognized as MPEG video, a watermark detection operation can be invoked.

Desirably, then, generic DVD drives are provided with built-in hardware or firmware that checks the raw data read from the disk for MPEG-like characteristics. (The details of prior art DVD drives are familiar to the artisan and are not belabored here.) If suspected MPEG data is identified, the hardware and/or firmware invokes a watermark reading operation (which may also be integrated with the drive, or external to it, and may be implemented in hardware, firmware, or software) to see if the data carries a CSS watermark. (This operation may, or may not, require full or partial decoding of the MPEG data stream. A wide variety of techniques for detecting watermarks from MPEG data streams are known.) If such a watermark is detected, the hardware and/or firmware can simply interrupt the read operation, or the provision of data on the output bus; no CSS watermarked video should be encountered on a DVD that is not CSS-encrypted.

It will be recognized that it is not always necessary to read (decode) the watermark. Once the presence of a CSS watermark has been detected, its data payload is substantially irrelevant. Often, implementation can be simplified (e.g., gate count can be reduced, or MIPs processing burden can be lessened) by skipping the final decoding steps once the watermark's presence has been ascertained.

To avoid certain hacks, the MPEG-detection system may be arranged to work on out-of-order sectors of data, in case the disk is read non-sequentially. Similarly, the system may be arranged to check for simple data inversion in its screening of the DVD data for possible MPEG video.

FIG. 1 shows such a system 10 that includes a sensor 14 for reading data from a DVD disc 12, an MPEG screening system 16, and a watermark sensor 18 (e.g., watermark reader) responsive to the output of the MPEG screening system. Desirably, these components 14-18 are provided as part of a DVD drive unit.

FIG. 2 shows a method 20 that may be performed by the system 10 of FIG. 1. Data is read from the storage medium (22) and is examined for one or more attributes associated with MPEG video (24). If such attribute is found (26), the process next determines whether a watermark is present (28). If so (30), the system responds by preventing playback (32).

To provide a comprehensive disclosure without unduly lengthening this specification, the above-cited patents are incorporated by reference.

Having described and illustrated the principles of my invention with reference to illustrative embodiments, it will be apparent that such embodiments can be modified in arrangement and detail without departing from such principles. Accordingly, I claim as my invention all such embodiments as fall within the scope and spirit of the following claims, and equivalents thereto.

I claim:

1. A non-transitory computer-readable medium having instructions stored thereon that, if executed by a computing device, cause the computing device to perform operations comprising:
reading data from a storage medium wherein a type of the data is unknown;
examining the data for a first attribute associated with a media type, wherein the media type is one of a plurality of standard media types;
determining the media type of the data based on the first attribute; and
determining whether a watermark is present if the media type of the data is a recognized media type.

2. The non-transitory computer-readable medium of claim 1, wherein the operations further comprise preventing playback of the data through an MPEG decoder if the watermark is present.

3. The non-transitory computer-readable medium of claim 1, wherein the operations further comprise enabling an operation connected to the data if the watermark is present.

4. The non-transitory computer-readable medium of claim 1, wherein the data is protected with an encryption system, wherein the watermark is associated with the encryption system, and wherein the operations further comprise enabling playback only if the watermark is present and matches the encryption system.

5. The non-transitory computer-readable medium of claim 1, wherein the first attribute comprises a probability, and wherein the first attribute is detected if the probability is above a first threshold.

6. The non-transitory computer-readable medium of claim 5, wherein the operations further comprise:
reading additional data from the storage medium if the probability is above a second threshold but below the first threshold;
examining the additional data for the first attribute associated with the media object;
determining whether the watermark is present only if the first attribute is detected from the data and the additional data.

7. The non-transitory computer-readable medium of claim 1, wherein the operations further comprise:
examining the data for a second attribute also associated with the media object if the first attribute is detected; and
determining whether the watermark is present only if the second attribute is also detected.

8. The non-transitory computer-readable medium of claim 1, wherein the first attribute comprises a presence of apparent macroblocks.

9. The non-transitory computer-readable medium of claim 1, wherein determining whether the watermark is present comprises performing a watermark-read operation.

10. The non-transitory computer-readable medium of claim 9, further comprising synchronizing the watermark-read operation in accordance with a characteristic of the data.

11. The non-transitory computer-readable medium of claim 10, wherein the characteristic is an apparent start of a macroblock.

12. The non-transitory computer-readable medium of claim 1, wherein the first attribute comprises an MPEG class signature in spectral or statistical data corresponding to the data.

13. The non-transitory computer-readable medium of claim 1, wherein the first attribute comprises a JPEG header.

14. A method comprising:
reading data, at a processor, from a storage medium, wherein a type of the data is unknown;
examining the data, at the processor, for a first attribute associated with a media type, wherein the media type is one of a plurality of standard media types;
determining the media type of the data based on the first attribute; and
determining, at the processor, whether a watermark is present if the media type of the data is a recognized media type.

15. The method of claim 14, further comprising preventing playback of the data through an MPEG decoder if the watermark is present.

16. The method of claim 14, further comprising enabling an operation connected to the data if the watermark is present.

17. The method of claim 14, wherein the data is protected with an encryption system, wherein the watermark is associated with the encryption system, and wherein the operations further comprise enabling playback only if the watermark is present and matches the encryption system.

18. A device comprising:
a processor;
a storage medium reader operatively coupled to the processor configured to read data from a storage medium wherein a type of the data is unknown;
a question module operatively coupled to the processor configured to examine the data for a first attributed associated with a media type, wherein the media type is one of a plurality of standard media types;
a second question module operatively coupled to the processor configured to determine the media type of the data based on the first attribute; and
a watermark reader operatively coupled to the processor and configured to determine whether a watermark is present if the media type of the data is a recognized media type.

19. The device of claim 18, wherein the processor is configured to prevent playback of the data through an MPEG decoder if the watermark is present.

20. The device of claim 18, wherein the processor is configured to enable an operation connected to the data if the watermark is present.

* * * * *

UNITED STATES PATENT AND TRADEMARK OFFICE
CERTIFICATE OF CORRECTION

| | | |
|---|---|---|
| PATENT NO. | : 8,374,491 B2 | Page 1 of 1 |
| APPLICATION NO. | : 10/841970 | |
| DATED | : February 12, 2013 | |
| INVENTOR(S) | : Rhoads | |

It is certified that error appears in the above-identified patent and that said Letters Patent is hereby corrected as shown below:

On the Title Page, Item (56), under "OTHER PUBLICATIONS", in Column 2, Line 4, delete "Dvd" and insert -- DVD --, therefor.

In the Specification

In Column 1, Line 52, delete "discemable" and insert -- discernable --, therefor.

Signed and Sealed this
Eleventh Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,374,491 B2 | Page 1 of 1 |
| APPLICATION NO. | : 10/841970 | |
| DATED | : February 12, 2013 | |
| INVENTOR(S) | : Rhoads | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2037 days.

Signed and Sealed this
Twenty-fifth Day of November, 2014

Michelle K. Lee
*Deputy Director of the United States Patent and Trademark Office*